(12) United States Patent
Chen et al.

(10) Patent No.: US 11,994,980 B2
(45) Date of Patent: May 28, 2024

(54) METHOD, DEVICE AND COMPUTER PROGRAM PRODUCT FOR APPLICATION TESTING

(71) Applicant: EMC IP Holding Company LLC, Hopkinton, MA (US)

(72) Inventors: Bailu Chen, Chengdu (CN); Linhao Zhou, Chengdu (CN); Longhuan Ye, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 17/825,138

(22) Filed: May 26, 2022

(65) Prior Publication Data

US 2023/0129159 A1    Apr. 27, 2023

(30) Foreign Application Priority Data

Oct. 22, 2021   (CN) .......................... 202111234077.1

(51) Int. Cl.
*G06F 11/36*    (2006.01)

(52) U.S. Cl.
CPC ...... *G06F 11/3688* (2013.01); *G06F 11/3692* (2013.01); *G06F 11/3696* (2013.01)

(58) Field of Classification Search
None
See application file for complete search history.

(56) References Cited

U.S. PATENT DOCUMENTS

| | | | | |
|---|---|---|---|---|
| 5,475,843 A * | 12/1995 | Halviatti | ............ | G06F 9/45512 719/329 |
| 7,584,089 B2 * | 9/2009 | Kuwata | ............... | G06F 40/126 704/7 |
| 7,802,184 B1 * | 9/2010 | Battilana | ............... | G06F 40/274 715/256 |
| 8,296,124 B1 * | 10/2012 | Holsztynska | ........... | G06F 40/51 704/7 |
| 10,452,758 B1 * | 10/2019 | Bhowmick | ........... | G06F 40/205 |
| 10,521,854 B1 * | 12/2019 | Andrizzi | ............ | G06Q 30/0631 |
| 10,812,533 B2 * | 10/2020 | Baumgart | ............ | H04L 63/101 |
| 11,010,284 B1 * | 5/2021 | Santiago | ................ | G06N 20/00 |

(Continued)

OTHER PUBLICATIONS

Tschernuth, "Unify Localization using User Interface Description Languages and a Navigation Context-Aware Translation Tool", 2012, ACM (Year: 2012).*

*Primary Examiner* — Hossain M Morshed
(74) *Attorney, Agent, or Firm* — BainwoodHuang

(57) ABSTRACT

Techniques for application test involve: acquiring a character string in an application interface of a target application; determining a current language corresponding to the character string based at least on a comparison between encoding representation of the character string and a set of predetermined encoding segments, each encoding segment in the set of predetermined encoding segments indicating a corresponding language; and determining a language test result for the character string based on a comparison between the current language and a target language to be presented in the target application, the language test result being used for indicating whether the character string is adapted to the target language. Accordingly, efficient detection on whether a text in the target application is displayed abnormally can be guaranteed.

15 Claims, 4 Drawing Sheets

(56) References Cited

U.S. PATENT DOCUMENTS

| | | | |
|---|---|---|---|
| 11,042,257 B1* | 6/2021 | Sciberras | G06F 11/3668 |
| 11,210,467 B1 | 12/2021 | Carvalho et al. | |
| 11,386,266 B2* | 7/2022 | Davidson | G06F 16/3347 |
| 2003/0084429 A1* | 5/2003 | Schaefer | G06F 11/3688 |
| | | | 717/125 |
| 2004/0187061 A1* | 9/2004 | Matsuda | G06F 40/129 |
| | | | 714/746 |
| 2007/0027670 A1* | 2/2007 | Verhey-Henke | G06F 40/154 |
| | | | 704/2 |
| 2009/0055395 A1* | 2/2009 | Jenks | G06F 16/84 |
| 2011/0179073 A1* | 7/2011 | Nilsson | G06F 9/454 |
| | | | 707/769 |
| 2015/0339213 A1* | 11/2015 | Lee | G06F 3/0484 |
| | | | 717/125 |
| 2016/0283462 A1 | 9/2016 | Gallé et al. | |
| 2017/0109442 A1* | 4/2017 | Berk | G06F 40/186 |
| 2018/0150448 A1* | 5/2018 | Gupta | G06F 40/58 |
| 2020/0159552 A1* | 5/2020 | Bodin | G06F 40/279 |
| 2022/0180056 A1 | 6/2022 | Hong et al. | |
| 2023/0129159 A1* | 4/2023 | Chen | G06F 11/3668 |
| | | | 717/124 |

* cited by examiner

METHOD, DEVICE AND COMPUTER PROGRAM PRODUCT FOR APPLICATION TESTING

CROSS-REFERENCE TO RELATED APPLICATION

This application claims priority to Chinese Patent Application No. CN202111234077.1, on file at the China National Intellectual Property Administration (CNIPA), having a filing date of Oct. 22, 2021 and having "METHOD, DEVICE AND COMPUTER PROGRAM PRODUCT FOR APPLICATION TESTING" as a title, the contents and teachings of which are herein incorporated by reference in their entirety.

TECHNICAL FIELD

Embodiments of the present disclosure relate to the field of computers, and more particularly, to a method, a device, and a computer program product for application test.

BACKGROUND

With the development of network technologies, increasingly more applications need to provide services to users in different regions. This makes such applications need to localize software to adapt to user habits of the corresponding regions. In the process of application localization, language localization is crucial. Incorrect translation will cause problems in application usability or language quality, which will seriously affect the normal use of applications by users.

SUMMARY OF THE INVENTION

A solution for application test is provided in embodiments of the present disclosure. According to a first aspect of the present disclosure, a method for application test is proposed. The method includes: acquiring a character string in an application interface of a target application; determining a current language corresponding to the character string based at least on a comparison between encoding representation of the character string and a set of predetermined encoding segments, each encoding segment in the set of predetermined encoding segments indicating a corresponding language; and determining (or generating) a language test result for the character string based on a comparison between the current language and a target language to be presented in the target application, the language test result being used for indicating whether the character string is adapted to the target language.

According to a second aspect of the present disclosure, an electronic device is proposed. The device includes: at least one processing unit; at least one memory coupled to the at least one processing unit and storing instructions for execution by the at least one processing unit, wherein the instructions, when executed by the at least one processing unit, cause the device to perform actions including: acquiring a character string in an application interface of a target application; determining a current language corresponding to the character string based at least on a comparison between encoding representation of the character string and a set of predetermined encoding segments, each encoding segment in the set of predetermined encoding segments indicating a corresponding language; and determining a language test result for the character string based on a comparison between the current language and a target language to be presented in the target application, the language test result being used for indicating whether the character string is adapted to the target language.

In a third aspect of the present disclosure, a computer program product is provided. The computer program product is stored in a non-transitory computer storage medium and includes machine-executable instructions that, when run in a device, cause the device to perform any step of the method described according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, the same reference numerals generally represent the same members.

DETAILED DESCRIPTION

Figure 1:
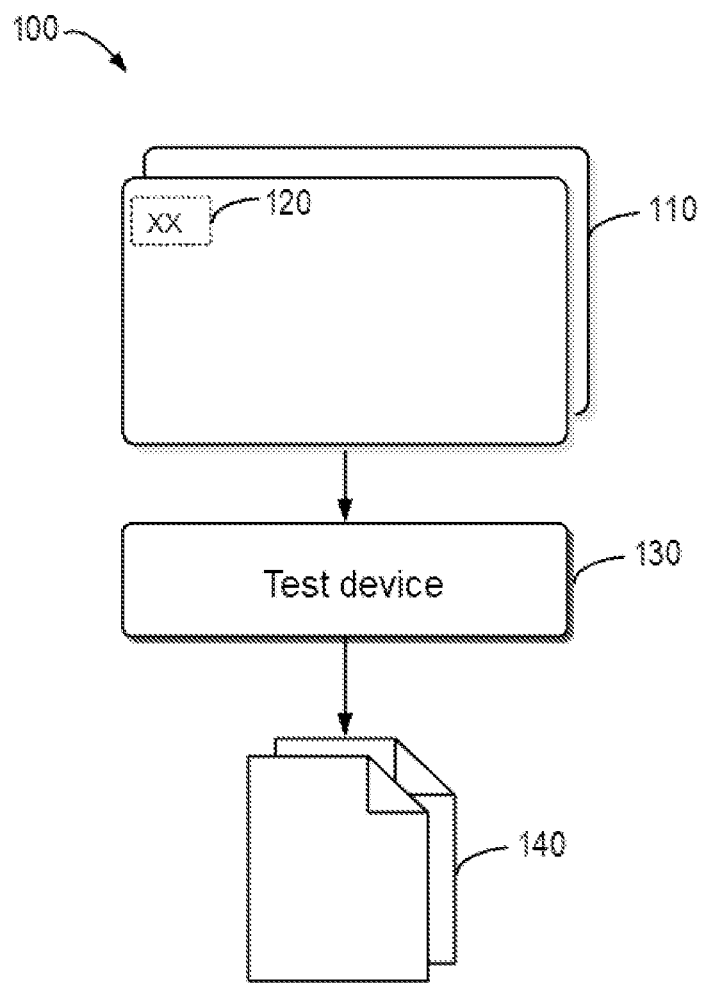
FIG. 1 shows a schematic diagram of an example system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned earlier, language localization is an important part of application localization. Incorrect translation will cause problems in the usability or language quality of an application, and will seriously affect the normal use of the application by users. However, a current application test process relies on manual review of character strings in an application interface, which is inefficient and error prone.

A solution for application test is provided in the embodiments according to the present disclosure. In this solution, a character string in an application interface of a target application may be acquired. Further, a current language corresponding to the character string may be determined based at least on a comparison between encoding representation of the character string and a set of predetermined encoding segments, where each encoding segment in the set of predetermined encoding segments indicates a corresponding language. Additionally, a language test result for the character string may be determined (or identified) based on a comparison between the current language and a target language to be presented in the target application, where the language test result is used for indicating whether the character string is adapted to the target language.

Based on this method, the embodiments of the present disclosure can automatically detect the accuracy of a text in the target application, so as to effectively detect situations such as missed text and garbled text in the application, and help improve the quality of application localization.

FIG. 1 shows example environment 100 in which embodiments of the present disclosure can be implemented. As shown in FIG. 1, the environment 100 includes test device 130, which may, for example, acquire character string 120 in target application 110, and determine (or provide) language test result 140 for character string 120.

In some embodiments, target application 110 may include any appropriate type of application (also referred to as a program or an application program), examples of which include, but are not limited to: a web application, a mobile terminal application, a desktop application, or the like.

A process of an automatic test of language localization of target application 110 by test device 130 will be described in detail below with reference to FIG. 2 to FIG. 3.

Figure 2:
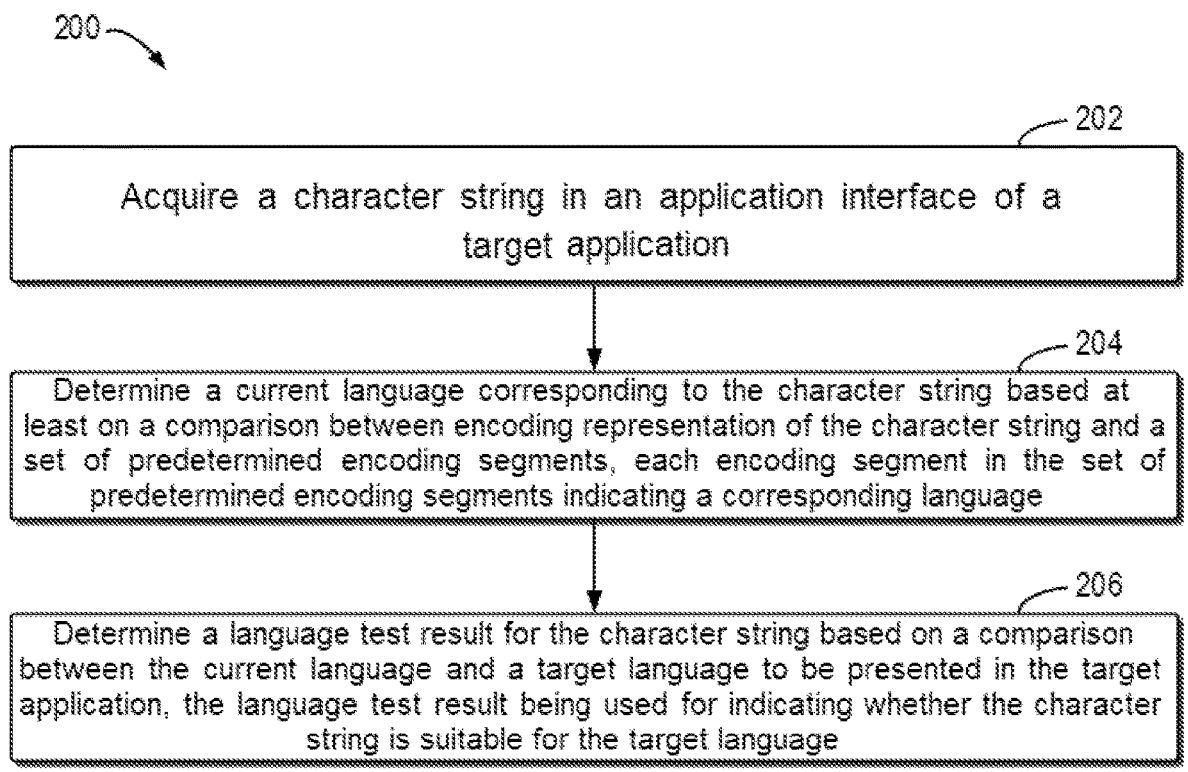
FIG. 2 shows a flowchart of a method for application test according to some embodiments of the present disclosure.

FIG. 2 shows a flowchart of process 200 for application test according to some embodiments of the present disclosure. Process 200 may be implemented, for example, by test device 130 shown in FIG. 1.

As shown in FIG. 2, in block 202, test device 130 acquires character string 120 in an application interface of target application 110.

In some embodiments, test device 130 may acquire character string 120 in the application interface by parsing the application interface of target application 110.

For example, test device 130 may run a test case to traverse all application interfaces of target application 110, and acquire character string 120 by acquiring source code corresponding to the application interface. Furthermore, taking a web application as an example, test device 130 may acquire source code corresponding to an application interface of the web application, and extract character string 120 therefrom.

In some embodiments, test device 130 may also, for example, extract character string 120 from an image of the application interface based on an image recognition technology.

In some embodiments, test device 130 may also acquire a language resource package associated with target application 110, which may include, for example, a character string presented in the application interface. Further, test device 130 may acquire corresponding character string 120 from the language resource package.

In some embodiments, character string 120 may include, for example, a word, sentence, or paragraph composed of one or more characters.

In block 204, test device 130 determines a current language corresponding to character string 120 based on at least a comparison between an encoding representation of character string 120 and a set of predetermined encoding segments, where each encoding segment in the set of predetermined encoding segments indicates a corresponding language.

In some embodiments, test device 130 may, for example, first convert character string 120 into an encoding representation in a specific encoding format. Examples of such an encoding format may include, but are not limited to: UTF-8 encoding, UTF-16 encoding, Unicode encoding, and the like.

In some embodiments, certain encoding segments in the encoding format may uniquely indicate corresponding languages. For example, taking Unicode encoding as an example, languages such as Chinese, Korean, and Japanese all have unique encoding segments. For example, an encoding segment corresponding to basic Chinese characters in Chinese is "4E00-9FA5."

Further, test device 130 determines the current language corresponding to character string 120 based on the comparison between the encoding representation of character string 120 and these predetermined encoding segments. A detailed process of block 204 will be described below with reference to FIG. 3. FIG. 3 is a flowchart of process 300 for determining a current language according to an embodiment of the present disclosure.

Figure 3:
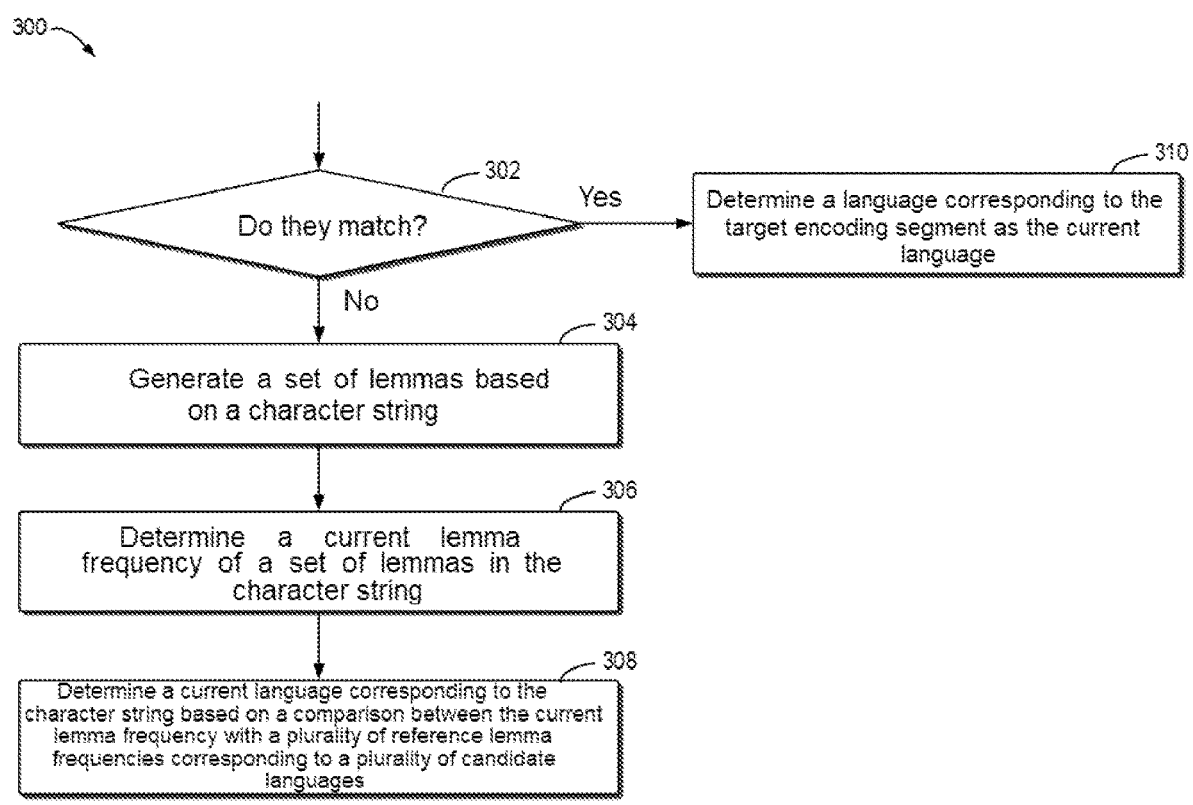
FIG. 3 shows a flowchart of a method for determining a current language according to some other embodiments of the present disclosure.

As shown in FIG. 3, in block 302, test device 130 may determine whether the encoding representation of character string 120 matches any encoding segment in the set of predetermined encoding segments. If it is determined in block 302 that the encoding representation matches a target encoding segment, process 300 may proceed to block 310. In block 310, test device 130 may determine a language corresponding to the target encoding segment as the current language.

For example, if the encoding representation of character string 120 falls in an encoding segment corresponding to Chinese, test device 130 may determine the current language of character string 120 as Chinese.

In contrast, if it is determined in block 302 that the encoding representation does not match the set of predetermined encoding segments, process 300 may proceed to block 304. In block 304, test device 130 may generate a set of lemmas based on the character string.

In some embodiments, test device 130 may, for example, use N-Gram (N-grammar) to generate a set of lemmas with the same length. Taking English as an example, for a character string "abcde," test device 130 may generate, for example, a set of lemmas "abc," "bcd," and "cde" with a length of 3.

In block 306, test device 130 may determine a current lemma frequency of the set of lemmas in character string 130. Specifically, test device 130 may determine a frequency of each lemma appearing in character string 130, so that a set of frequencies corresponding to the set of lemmas can be determined.

In block 308, test device 130 may determine the current language corresponding to the character string based on a comparison between the current lemma frequency and a plurality of reference lemma frequencies corresponding to a plurality of candidate languages.

In some embodiments, test device 130 may also acquire the plurality of reference lemma frequencies corresponding to the plurality of candidate languages. The reference lemma frequency can, for example, describe the frequency of each lemma appearing in the corresponding language.

In some embodiments, test device 130 may further determine the current language of character string 130 based on a distance between the lemma frequencies. Specifically, test device 130 may determine a first distance between the current lemma frequency and a first reference lemma frequency corresponding to a first reference language, where the first reference language corresponds to an original development language of target application 110.

For example, target application 110 may be originally developed based on English, which needs to be localized into French. Correspondingly, test device 130 may determine a first distance between the current lemma frequency and an English lemma frequency corresponding to English.

Specifically, test device 130 may determine a lemma distance for each lemma in the set of lemmas. For example, test device 130 may determine whether the lemma is included in the first reference lemma frequency.

If the lemma is not included in the first reference lemma frequency, the lemma distance may be set to, for example, a large predetermined value. On the contrary, if the lemma is included in the first reference lemma frequency, the lemma distance may be determined as a difference between a first frequency of the lemma in the character string and a second frequency indicated by the first reference lemma frequency.

Further, test device 130 may determine the first distance between the current lemma frequency and the first reference lemma frequency based on a lemma distance of each lemma in the set of lemmas.

Further, test device 130 may also determine a second distance between the current lemma frequency and a second reference lemma frequency corresponding to the target language. For example, if target application 110 may be originally developed based on English and needs to be localized into French, the target language may be determined as French. Test device 130 may further determine the second distance based on the current lemma frequency and a French lemma frequency corresponding to French.

In some embodiments, if the first distance is greater than the second distance, test device 130 may determine the target language as the current language. On the contrary, if the first distance is less than or equal to the second distance, test device 130 may determine the first reference language as the current language.

Still referring to FIG. 2, in block 206, test device 130 determines a language test result for the character string based on a comparison between the current language and the target language to be presented in the target application, where the language test result is used for indicating whether the character string is adapted to the target language. In some embodiments, the target language may represent the language corresponding to a region where the target application is to be localized.

In some embodiments, if the current language matches the target language, test device 130 may, for example, determine that the language of character string 120 meets localization requirements. Additionally, test device 130 may, for example, determine a degree of grammatical rationality and/or degree of semantic rationality of character string 120, and further determine the language test result for the character string based on the degree of grammatical rationality and/or degree of semantic rationality.

It should be understood that any appropriate natural language processing technology can be used to determine the degree of grammatical rationality and degree of semantic rationality of the character string. The present disclosure is not intended to limit this.

For example, the language test result of character string 120 may indicate that the current language of the character string is the target language, and the grammar and semantics of the character string conform to specifications of the target language.

In some embodiments, if the current language of character string 120 does not match the target language, test device 130 may also query a predetermined character string set to determine whether the character string is a preset character string allowed to be presented.

For example, if the target language is Chinese, some non-Chinese character strings may still be allowed to be displayed in some interfaces, for example. These character strings may be added to a predetermined character string set as, for example, a display white list.

In some embodiments, if it is determined that character string 120 is a preset character string allowed to be presented, test device 130 may determine language test result 140 for character string 120 to indicate that character 120 is adapted to the target language.

In some embodiments, if the current language of character string 120 is not the target language, and character string 120 is not a preset character string allowed to be presented, test device 130 may determine language test result 140 for the character string to indicate that character string 120 is not adapted to the target language.

In some embodiments, if language test result 140 indicates that character string 120 is not adapted to the target language, test device 140 may, for example, further generate a warning associated with character string 120 to indicate that character string 120 is not adapted to the target language. For example, test device 140 may indicate which character string in which application interface is not adapted to the target language through a graphical interface.

In some embodiments, test device 130 may also present language test result 140 determined based on the above-discussed process to the user in an appropriate manner, such as a graphical interface, an email, or a short message.

Based on the process discussed above, the embodiments of the present disclosure can realize automatic test in a language localization process of an application, and can automatically identify characters in the application that have not been translated, or characters that are not compliant with the display (such as, garbled characters), etc. Therefore, the embodiments of the present disclosure can help improve the test efficiency of language localization and help improve the usability of a localized application.

Figure 4:
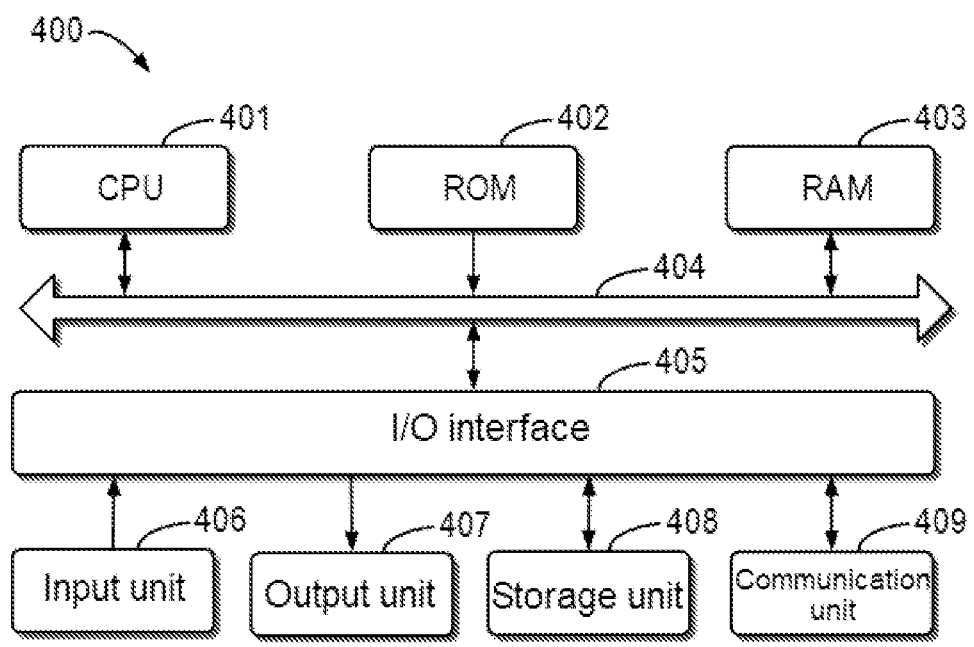
FIG. 4 shows a block diagram of an example device that can be configured to implement embodiments of the present disclosure.

FIG. 4 shows a schematic block diagram of example device 400 that may be configured to implement embodiments of the present disclosure. For example, test device 130 according to the embodiments of the present disclosure may be implemented by device 400. As shown in the figure, device 400 includes central processing unit (CPU) 401 that may execute various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A number of components in device 400 are connected to I/O interface 405, including: an input unit 406, such as a keyboard and a mouse; an output unit 407, such as various types of displays and speakers; a storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

Various processes and processing described above, for example, processes 200 and/or 300, may be performed by processing unit 401. For example, in some embodiments, processes 200 and/or 300 may be implemented as computer software programs that are tangibly included in a machine-readable medium, for example, storage unit 408. In some embodiments, part of or all the computer programs may be loaded and/or installed onto device 400 via ROM 402 and/or communication unit 409. When the computer programs are loaded into RAM 403 and executed by CPU 401, one or more actions of processes 200 and/or 300 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product according to the embodiments of the present disclosure. It should be understood that each block of the flowcharts and/or the block diagrams and combinations of blocks in the flowcharts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented by using a special hardware-based system that executes specified functions or actions, or implemented using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method of performing, by a test device including at least one processing unit, a process for testing language localization of a target application, comprising:
    acquiring a character string in an application interface of the target application by parsing the application interface of the target application;
    converting the character string into an encoding representation of the character string, wherein the encoding representation of the character string comprises a Unicode Transformation Format (UTF) encoding representation of the character string;
    determining a current language corresponding to the character string based at least on a comparison between encoding representation of the character string and a set of predetermined encoding segments, each encoding segment in the set of predetermined encoding segments indicating a corresponding language; and
    determining a language test result for the character string based on a comparison between the current language and a target language to be presented in the target application, the language test result being used for indicating whether the character string is adapted to the target language, wherein determining the language test result for the character string includes:
        determining, by querying a predetermined character string set, whether the character string is a preset character string allowed to be presented, in response to the current language not matching the target language,
        determining, in response to the character string being the preset character string allowed to be presented, the language test result for the character string to indicate that the character string is adapted to the target language, and
        in response to the character string being not the preset character string allowed to be presented, determining that the language test result for the character string to indicate that the character string is not adapted to the target language, and generating, through a graphical user interface of the test device, a warning associated with the character string to indicate that the character string is not adapted to the target language, whereby characters of the target application that have not been translated to the target language are identified.

2. The method according to claim 1, wherein determining a current language corresponding to the character string comprises:
    determining, in response to the encoding representation matching a target encoding segment in the set of predetermined encoding segments, a language corresponding to the target encoding segment as the current language.

3. The method according to claim 1, wherein determining a current language corresponding to the character string comprises:
    generating a set of lemmas based on the character string in response to the encoding representation not matching the set of predetermined encoding segments;
    determining a current lemma frequency of the set of lemmas in the character string; and
    determining the current language corresponding to the character string based on a comparison between the current lemma frequency and a plurality of reference lemma frequencies corresponding to a plurality of candidate languages.

4. The method according to claim 3, wherein generating a set of lemmas based on the character string comprises:
    generating the set of lemmas having a predetermined length based on the character string.

5. The method according to claim 3, wherein determining the current language corresponding to the character string based on a comparison between the current lemma frequency and a plurality of reference lemma frequencies corresponding to a plurality of candidate languages comprises:
    determining a first distance between the current lemma frequency and a first reference lemma frequency corresponding to a first reference language, wherein the first reference language corresponds to an original development language of the target application;
    determining a second distance between the current lemma frequency and a second reference lemma frequency corresponding to the target language; and
    determining the target language as the current language in response to the first distance being greater than the second distance.

6. The method according to claim 5, wherein determining the current language corresponding to the character string based on a comparison between the current lemma frequency and a plurality of reference lemma frequencies corresponding to a plurality of candidate languages further comprises:
   determining the target language as the current language in response to the first distance being less than or equal to the second distance.

7. The method according to claim 1, wherein determining a language test result for the character string comprises:
   determining, in response to the current language matching the target language, a degree of grammatical rationality and a degree of semantic rationality of the character string; and
   determining the language test result for the character string based on the degree of grammatical rationality and the degree of semantic rationality.

8. An electronic test device, comprising:
   at least one processing unit;
   at least one memory coupled to the at least one processing unit and storing instructions for execution by the at least one processing unit, wherein the instructions, when executed by the at least one processing unit, cause the test device to perform a process for testing language localization of a target application by performing actions comprising:
      acquiring a character string in an application interface of the target application by parsing the application interface of the target application;
      converting the character string into an encoding representation of the character string, wherein the encoding representation of the character string comprises a Unicode Transformation Format (UTF) encoding representation of the character string;
      determining a current language corresponding to the character string based at least on a comparison between encoding representation of the character string and a set of predetermined encoding segments, each encoding segment in the set of predetermined encoding segments indicating a corresponding language; and
      determining a language test result for the character string based on a comparison between the current language and a target language to be presented in the target application, the language test result being used for indicating whether the character string is adapted to the target language, wherein determining the language test result for the character string includes:
         determining, by querying a predetermined character string set, whether the character string is a preset character string allowed to be presented, in response to the current language not matching the target language,
         determining, in response to the character string being the preset character string allowed to be presented, the language test result for the character string to indicate that the character string is adapted to the target language, and
         in response to the character string being not the preset character string allowed to be presented, determining that the language test result for the character string to indicate that the character string is not adapted to the target language, and generating, through a graphical user interface of the test device, a warning associated with the character string to indicate that the character string is not adapted to the target language, whereby characters of the target application that have not been translated to the target language are identified.

9. The electronic device according to claim 8, wherein determining a current language corresponding to the character string comprises:
   determining, in response to the encoding representation matching a target encoding segment in the set of predetermined encoding segments, a language corresponding to the target encoding segment as the current language.

10. The electronic device according to claim 8, wherein determining a current language corresponding to the character string comprises:
    generating a set of lemmas based on the character string in response to the encoding representation not matching the set of predetermined encoding segments;
    determining a current lemma frequency of the set of lemmas in the character string; and
    determining the current language corresponding to the character string based on a comparison between the current lemma frequency and a plurality of reference lemma frequencies corresponding to a plurality of candidate languages.

11. The electronic device according to claim 10, wherein generating a set of lemmas based on the character string comprises:
    generating the set of lemmas having a predetermined length based on the character string.

12. The electronic device according to claim 10, wherein determining the current language corresponding to the character string based on a comparison between the current lemma frequency and a plurality of reference lemma frequencies corresponding to a plurality of candidate languages comprises:
    determining a first distance between the current lemma frequency and a first reference lemma frequency corresponding to a first reference language, wherein the first reference language corresponds to an original development language of the target application;
    determining a second distance between the current lemma frequency and a second reference lemma frequency corresponding to the target language; and
    determining the target language as the current language in response to the first distance being greater than the second distance.

13. The electronic device according to claim 12, wherein determining the current language corresponding to the character string based on a comparison between the current lemma frequency and a plurality of reference lemma frequencies corresponding to a plurality of candidate languages further comprises:
    determining the target language as the current language in response to the first distance being less than or equal to the second distance.

14. The electronic device according to claim 8, wherein determining a language test result for the character string comprises:
    determining, in response to the current language matching the target language, a degree of grammatical rationality and a degree of semantic rationality of the character string; and
    determining the language test result for the character string based on the degree of grammatical rationality and the degree of semantic rationality.

15. A computer program product having a non-transitory computer readable medium which stores a set of instructions to application test; the set of instructions, when carried out by computerized circuitry, causing the computerized circuitry of a test device to perform a method of testing language localization of a target application, comprising:

acquiring a character string in an application interface of the target application by parsing the application interface of the target application;

converting the character string into an encoding representation of the character string, wherein the encoding representation of the character string comprises a Unicode Transformation Format (UTF) encoding representation of the character string;

determining a current language corresponding to the character string based at least on a comparison between encoding representation of the character string and a set of predetermined encoding segments, each encoding segment in the set of predetermined encoding segments indicating a corresponding language; and determining a language test result for the character string based on a comparison between the current language and a target language to be presented in the target application, the language test result being used for indicating whether the character string is adapted to the target language, wherein determining the language test result for the character string includes:

determining, by querying a predetermined character string set, whether the character string is a preset character string allowed to be presented, in response to the current language not matching the target language, determining, in response to the character string being the preset character string allowed to be presented, the language test result for the character string to indicate that the character string is adapted to the target language, and in response to the character string being not the preset character string allowed to be presented, determining that the language test result for the character string to indicate that the character string is not adapted to the target language, and generating, through a graphical user interface of the test device, a warning associated with the character string to indicate that the character string is not adapted to the target language, whereby characters of the target application that have not been translated to the target language are identified.

* * * * *